(No Model.)
R. S. GREENWOOD.
SEAT ATTACHMENT FOR BICYCLES.
No. 441,485. Patented Nov. 25, 1890.
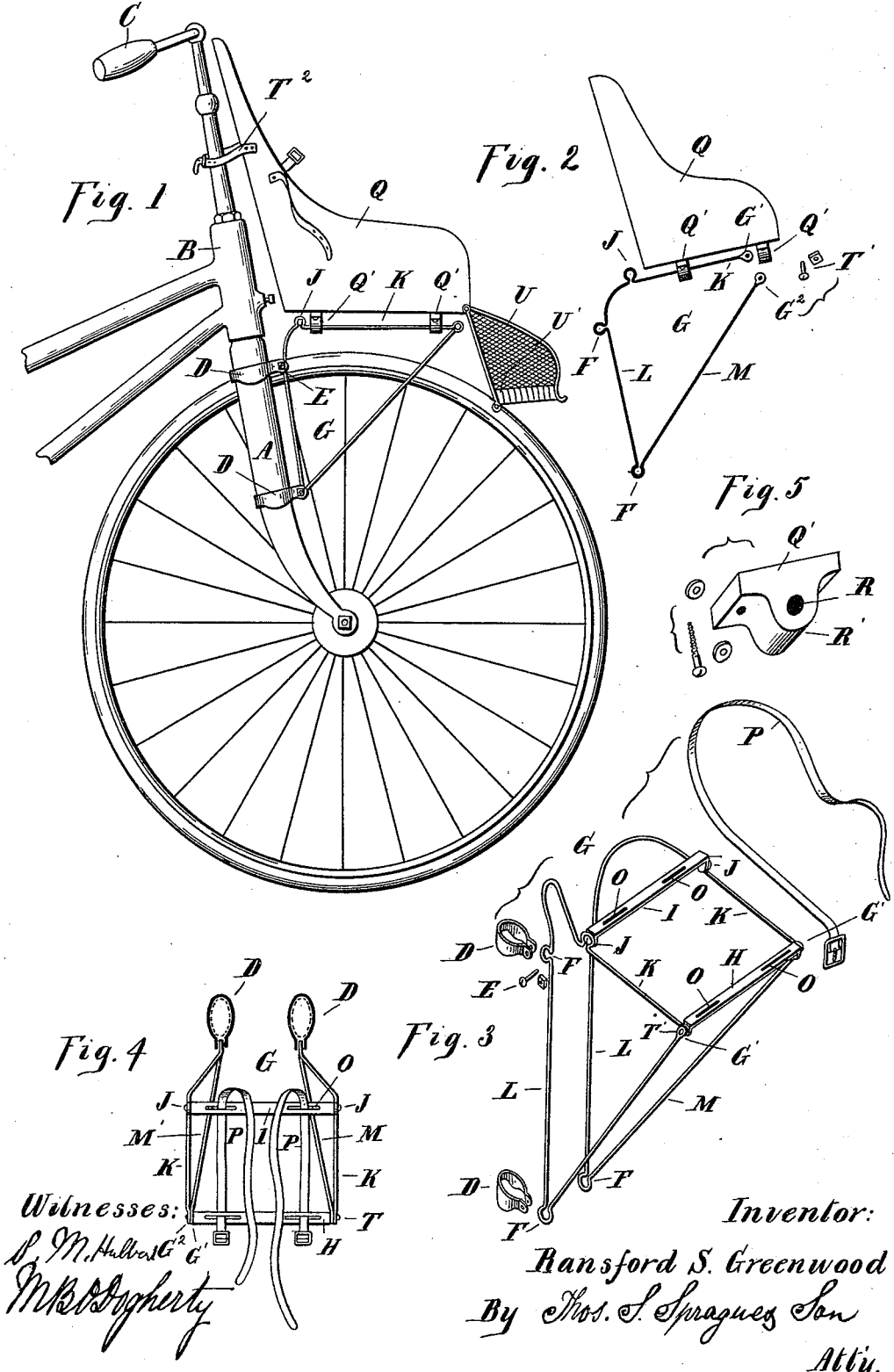
Witnesses:
S. M. Hulbert
M. B. O'Dougherty
Inventor:
Ransford S. Greenwood
By Thos. S. Sprague & Son
Atty.

UNITED STATES PATENT OFFICE.

RANSFORD S. GREENWOOD, OF HOWELL, MICHIGAN.

SEAT ATTACHMENT FOR BICYCLES.

SPECIFICATION forming part of Letters Patent No. 441,485, dated November 25, 1890.

Application filed July 10, 1890. Serial No. 358,334. (No model.)

*To all whom it may concern:*

Be it known that I, RANSFORD S. GREENWOOD, a citizen of the United States, residing at Howell, in the county of Livingston and State of Michigan, have invented certain new and useful Improvements in Seat Attachment for Bicycles, of which the following is a specification, reference being had therein to the accompanying drawings.

This invention relates to new and useful improvements in a combined package and seat support for bicycles; and the invention consists in the peculiar construction of a light frame, preferably of triangular shape, adapted to receive an auxiliary seat or to receive straps by means of which a package may be secured upon the same, and, further, in the peculiar construction, arrangement, and combination of the various parts, all as more fully hereinafter described.

In the accompanying drawings, Figure 1 is a side elevation of the front standard of a bicycle to which my device is attached. Fig. 2 is a detached elevation of the frame and seat partly put together. Fig. 3 is a detached perspective view of the frame and straps. Fig. 4 is a plan view of the frame, and Fig. 5 is a detached perspective view of the rubber blocks for the seat.

A is the front standard of the bicycle. B is the head, and C is the handle.

D are clamping-plates secured near the top and bottom of the fork of the standard, and provided with suitable eyes to receive the securing-bolt E, which also passes through suitable eyes F, formed in the frame G. This frame consists of wires, each bent into eyes F, formed by bends or loops therein, the two ends of the wire meeting at the upper forward angle, and having suitable eyes $G'$ $G^2$ formed therein to receive the ends of the connecting-bar H, a similar bar I engaging with eyes J, formed in the horizontal portion K of the frame. The vertical or attaching portion L carries the eyes F. The portion M forms the brace-wire. The frame is attached to the standard by means of the bolts E. The cross-bars I H are suitably apertured at O to receive the straps P, by means of which a bundle may be secured firmly upon the frame.

Q is the seat provided on its under side with yielding bearing-blocks $Q'$, preferably formed of rubber having the aperture R formed in the boss $R'$.

To secure the seat in position the bolts $T'$, which secure the ends of the frame together, are disengaged and the portion K of the frame is inserted through the apertures R in the rubber blocks secured to the under side of the seat, when the bolts $T'$ are again secured in position and the seat is firmly locked upon the frame. A strap $T^2$, attached to the back of the seat, is buckled around the standard and holds the top of the seat from lateral displacement. The front of the seat is provided with a fender U, having the depending foot-guards $U'$, preferably formed of a wire frame covered with any suitable fabric.

It will thus be seen that my frame may be quickly changed from a seat-holder to a package-holder, and that it is equally desirable for either.

What I claim as my invention is—

1. A detachable package and seat support for bicycles, consisting of a wire frame formed of two like parts of substantially triangular shape, having a vertical portion adapted to be secured to the front fork on opposite sides of the wheel, a horizontal portion adapted to receive the load, and an inclined portion acting as a stay or truss, substantially as described.

2. A detachable package and seat support for bicycles, consisting of a wire frame of substantially triangular shape secured to the front fork, of connecting-bars, such as H, having apertures for a strap or straps, and straps adapted to engage in said apertures, substantially as described.

3. A detachable package and seat support for bicycles, consisting of a wire frame of substantially triangular form, having the meeting ends at its upper forward angle, means for disconnecting said ends, and a seat adapted to engage therewith, substantially as described.

4. A detachable package and seat support for bicycles, consisting of a wire frame of substantially triangular form, having the meeting ends at its upward forward angle, of the seat provided with apertured blocks $Q'$, adapted to engage upon the horizontal portion of said frame, substantially as described.

5. A detachable package and seat support for bicycles, consisting of a frame secured to the front fork, substantially as described, and means for opening said frame, of a seat provided with yielding blocks Q', having apertures R, adapted to engage with horizontal portions of the frame, substantially as described.

6. A detachable package and seat support for bicycles, consisting of two like wire frames of substantially triangular form, having eyes F, formed integral therewith, of the eyes G' G², and bolts T', substantially as described.

7. In a detachable package and seat support for bicycles, the combination of the wire frame of substantially triangular form, the clamps D, engaging with the eyes F, formed integral with said frame, the cross-bars H and I, apertures O, and the bolts T', engaging with said cross-bars and with the eyes G' G² of the frame, substantially as described.

In testimony whereof I affix my signature in presence of two witnesses.

RANSFORD S. GREENWOOD.

Witnesses:
W. S. SANDELANDS,
H. C. WIGHT.